(12) United States Patent
Emtman et al.

(10) Patent No.: US 9,212,883 B2
(45) Date of Patent: Dec. 15, 2015

(54) CALIPER FORCE INDICATOR WITH TACTILE OR AUDITORY FEEDBACK

(71) Applicant: Mitutoyo Corporation, Kanagawa-ken (JP)

(72) Inventors: Casey E. Emtman, Kirkland, WA (US); William Randall Garrity, Bremerton, WA (US); Michael Edward Goldsworthy, Seattle, WA (US)

(73) Assignee: Mitutoyo Corporation, Kanagawa (JP)

( * ) Notice: Subject to any disclaimer, the term of this patent is extended or adjusted under 35 U.S.C. 154(b) by 75 days.

(21) Appl. No.: 14/267,666

(22) Filed: May 1, 2014

(65) Prior Publication Data

US 2015/0316365 A1  Nov. 5, 2015

(51) Int. Cl.
  G01B 3/20  (2006.01)
(52) U.S. Cl.
  CPC .................................. *G01B 3/20* (2013.01)
(58) Field of Classification Search
  CPC .......................................................... G01B 3/20
  USPC .................................... 33/783, 784, 813, 820
  See application file for complete search history.

(56) References Cited

U.S. PATENT DOCUMENTS

| | | | |
|---|---|---|---|
| 5,029,402 A | 7/1991 | Lazecki et al. | |
| 5,574,381 A | 11/1996 | Andermo et al. | |
| 5,886,519 A | 3/1999 | Masreliez et al. | |
| 5,901,458 A | 5/1999 | Andermo et al. | |
| 5,973,494 A | 10/1999 | Masreliez et al. | |
| RE37,490 E | 1/2002 | Andermo et al. | |
| 6,400,138 B1 | 6/2002 | Andermo | |
| 7,246,032 B2 | 7/2007 | Feldman | |
| 7,530,177 B1 | 5/2009 | Meichle et al. | |
| 7,533,474 B2 | 5/2009 | Saito et al. | |
| 2003/0047009 A1 | 3/2003 | Webb | |
| 2003/0217478 A1* | 11/2003 | Matsumiya | B82Y 30/00 33/784 |
| 2008/0250665 A1* | 10/2008 | Hayashida | G01B 3/18 33/825 |
| 2011/0137967 A1 | 6/2011 | Jansson | |
| 2014/0150272 A1* | 6/2014 | Emtman | G01B 3/30 33/558.04 |

(Continued)

OTHER PUBLICATIONS

U.S. Appl. No. 13/706,225, filed Dec. 5, 2012, entitled "System and Method for Setting Measurement Force Thresholds in a Force Sensing Caliper," 36 pages.

(Continued)

*Primary Examiner* — G. Bradley Bennett
(74) *Attorney, Agent, or Firm* — Seed IP Law Group PLLC

(57) ABSTRACT

A force indicator arrangement provides tactile or auditory feedback regarding a measuring force applied through a force actuator to a caliper jaw. The force indicator arrangement, coupled between the force actuator and the caliper jaw, includes an incremented member, an engaging member and a compliant element. The incremented member includes increment marker(s), and the engaging member is arranged to engage the increment marker(s) to produce tactile and/or auditory feedback (e.g., clicks) to indicate an amount of measuring force that is being applied arising from deformation of the compliant element. Different increment marker configurations may be provided to indicate different levels of measuring force. A set of interchangeable force indicator arrangements with different force sensitivities may be provided for use in different applications. A retrofitable force indicator arrangement may also utilize a fastening configuration that is compatible with existing mounting features on existing caliper jaws.

20 Claims, 6 Drawing Sheets

(56) References Cited

U.S. PATENT DOCUMENTS

| | | | |
|---|---|---|---|
| 2014/0150570 A1* | 6/2014 | Nahum | G01L 1/00 73/862.541 |
| 2014/0247717 A1* | 9/2014 | Jamadagni | H04W 4/06 370/230 |
| 2015/0247742 A1* | 9/2015 | Cook | G01B 5/00 33/784 |

OTHER PUBLICATIONS

U.S. Appl. No. 14/194,320, filed Feb. 28, 2014, entitled "Displacement Sensor for Force Indicating Caliper," 35 pages.

U.S. Appl. No. 14/194,461, filed Feb. 28, 2014, entitled "Wheel Assembly for Moving Caliper Jaw with Repeatable Force," 34 pages.

U.S. Appl. No. 14/231,492, filed Mar. 31, 2014, entitled "Flexible Mount for Coupling Force Actuator to Caliper Jaw," 27 pages.

\* cited by examiner

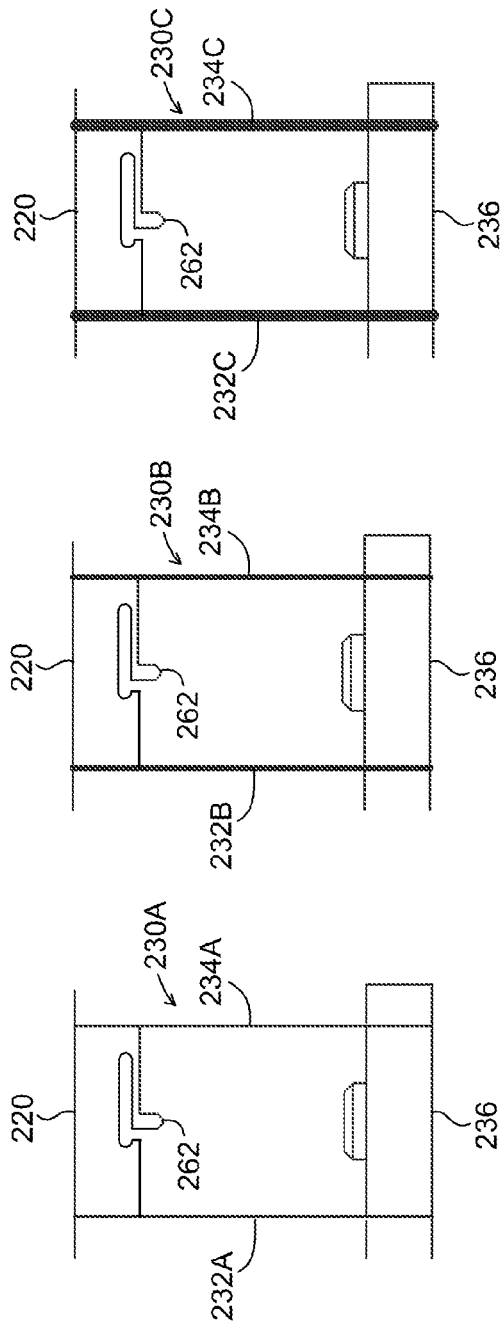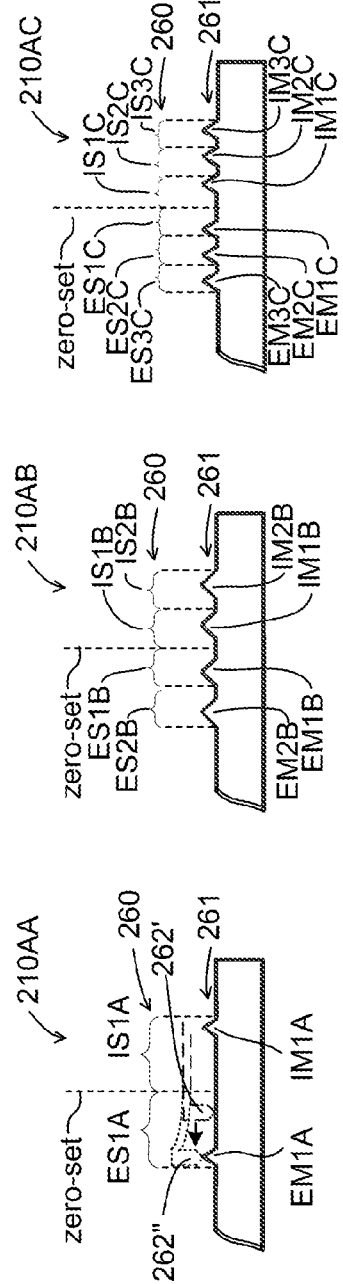

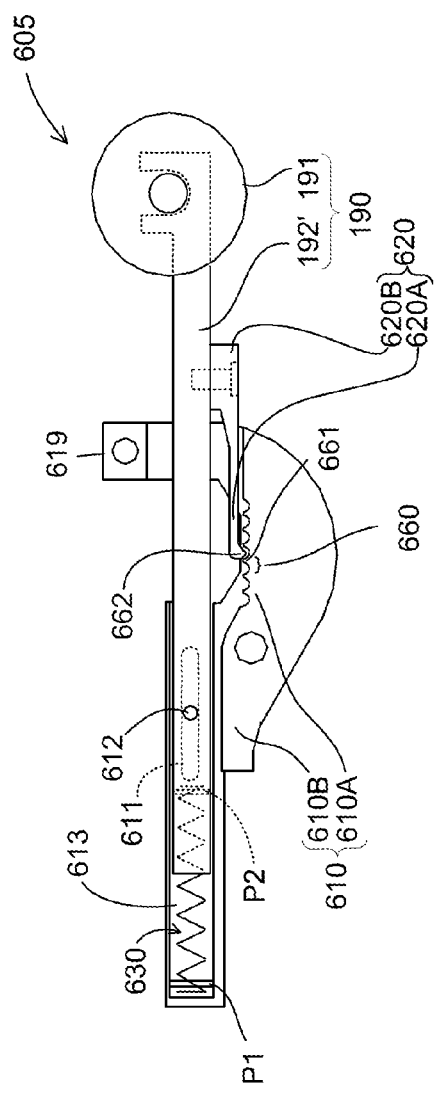
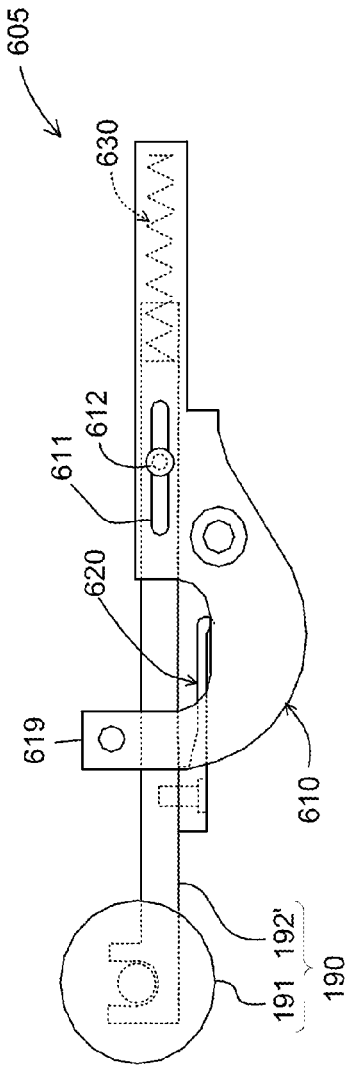
FIG.6A.
FIG.6B.

CALIPER FORCE INDICATOR WITH TACTILE OR AUDITORY FEEDBACK

BACKGROUND

1. Technical Field

The invention relates to precision measurement instruments, and to calipers with a movable jaw for measuring the dimensions of an object.

2. Description of the Related Art

Calipers utilize pairs of jaws for determining measurements. A first jaw is generally fixed at one end of a measurement scale while a second jaw is attached to a slider assembly that moves along the measurement scale. An outer dimension of an object may be measured by arranging the object between and against inner surfaces of the first and second jaws. An inner dimension of an object may be measured by arranging outer surfaces of the first and second jaws against the inner surfaces of the object (e.g. the walls of a hole). The slider assembly may be moved with a user's thumb, and a thumb wheel may be provided for improved control. One exemplary caliper utilizing a thumb wheel is described in U.S. Pat. No. 7,533,474, which is hereby incorporated herein by reference in its entirety.

For measuring the distance between the jaws of the caliper, electronic position encoders may be used, based on low-power inductive, position sensing technology for example. Such an encoder may comprise a readhead and a scale. The readhead may comprise a readhead sensor and readhead electronics. The readhead outputs signals that vary as a function of the position of the readhead sensor relative to the scale along a measuring axis. The scale may be affixed to an elongated scale member that includes a fixed first measuring jaw. The readhead is affixed to a slider assembly including the second measuring jaw, which is movable along the scale member. Measurements of the distance between the two measuring jaws may be determined based on the signals from the readhead.

Exemplary electronic calipers are disclosed in commonly assigned U.S. Pat. Nos. RE37490, 5,574,381, and 5,973,494, each of which is hereby incorporated by reference in its entirety. A prior art electronic caliper that is capable of measuring force is disclosed in U.S. Patent Publication No. 2003/0047009. As described in the '009 publication, one deficiency in the use of prior calipers is the variation in force applied by the measuring jaws and measurement differences which can occur as a result. Particularly when a soft object is measured, the measurement may be non-repeatable because one may apply either a higher force or lower force on the jaws of the caliper such that the soft object is "more compressed", or "less compressed". The '009 publication discloses a caliper that is capable of measuring both the size and force applied to an object, which may be analyzed to provide more repeatable measurements. However, the force sensing and indicating features of the caliper of the '009 publication may be considered "overkill" and/or too expensive and/or complex by many caliper users. A need exists for improving measurement force control and/or repeatability in a caliper in an economical, ergonomically convenient, repeatable, and intuitively understandable manner.

BRIEF SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

A force indicator arrangement provides user feedback regarding a measuring force applied through a force actuator to a caliper jaw that moves along a caliper scale member along a measuring axis direction in a caliper. The force indicator arrangement includes an incremented member, an engaging member and a compliant element. The incremented member is coupled to one of the caliper jaw and the force actuator and includes at least a first incremented section having a corresponding first increment marker. The engaging member is coupled to the other of the caliper jaw and the force actuator and is arranged to engage the first increment marker when the engaging member and the incremented member are positioned at a first relative displacement. The compliant element (e.g., a bending spring element, a torsion spring element, a coil spring element, an elastomeric material element, etc.) is positioned to couple forces between the force actuator and the caliper jaw.

The force indicator arrangement is configured such that when it is coupled to the caliper jaw and the force actuator, the force actuator moves with the caliper jaw along the caliper scale member. In addition, when a force is applied to the force actuator to provide a force along the measuring axis direction, the compliant element deforms such that the force actuator undergoes a forced relative displacement relative to the one of the incremented member and the engaging member that is coupled to the caliper jaw. This generates a measuring force that depends on that forced relative displacement. Furthermore, when the forced relative displacement includes the first relative displacement, at least one of the engaging or disengaging of the engaging member with the first increment marker results in at least one of a tactile or auditory feedback (e.g., a "click") to indicate a corresponding first respective measuring force.

By providing tactile and/or auditory feedback, a user is not required to observe a force indication while also trying to observe a measurement of the caliper. In prior force indicating calipers, the force indications have typically been provided visually (e.g., on a scale or LCD display), which has required the user to perform the difficult task of simultaneously visually monitoring the force indication, caliper measurement value and/or caliper jaws. By providing tactile and/or auditory feedback related to the measurement force, a user is able to observe the measurement value and/or caliper jaws while still receiving guidance as to the amount of measurement force that is being applied. The tactile and/or auditory feedback allows users to achieve more consistent and/or repeatable measurement results, especially for compliant workpieces (e.g., by preventing the application of too little or too much measuring force which may result in erroneous and/or non-repeatable measurements).

In various implementations, the compliant element may be configured for bi-directional elastic coupling of the force actuator to the caliper jaw. In one implementation, force applied to the force actuator in a first direction along the measuring axis direction generates a first polarity deformation of the compliant element which generates a first polarity measuring force applied to the caliper jaw. In addition, force applied to the force actuator in a second direction along the measuring axis direction generates a second polarity deformation of the compliant element which generates a second polarity measuring force applied to the caliper jaw. In one implementation, the first incremented section having the corresponding first increment marker is designated as a first polarity incremented section, the first relative displacement is designated as a first polarity relative displacement, and the first respective measuring force is designated as a force applied to the force actuator in the first direction. The incremented member also includes a second polarity incremented section having a corresponding second polarity increment marker. The engaging member is also arranged to engage the second increment marker when the engaging member and the incremented member are positioned at a second polarity relative displacement. Furthermore, when the forced relative displacement includes the second polarity relative displacement, at least one of the engaging or disengaging of the engaging member with the second polarity increment marker results in at least one of a tactile or auditory feedback being produced to indicate a respective second polarity measuring force applied to the force actuator in the second direction.

In various implementations, the incremented member includes at least a second incremented section having a corresponding second increment marker in the first direction. The engaging member is further arranged to engage the second increment marker when the engaging member and the incremented member are positioned at a second relative displacement that is greater than the first relative displacement in the first direction. In addition, when the forced relative displacement includes the second relative displacement, at least one of the engaging or disengaging of the engaging member with the second increment marker results in at least one of a tactile or auditory feedback being produced to indicate a corresponding second respective measuring force in the first direction.

In various implementations, the incremented member includes one or more additional incremented sections in addition to the second incremented section, each of the one or more additional incremented sections having a corresponding additional increment marker. The engaging member is further arranged to respectively engage one of the additional increment markers when the engaging member and the incremented member are respectively positioned at an additional respective relative displacement that is greater than the second relative displacement. In addition, when the forced relative displacement includes one of the additional respective relative displacements, at least one of the engaging or disengaging of the engaging member with the respective additional increment marker results in at least one of a tactile or auditory feedback being produced to indicate a corresponding additional respective measuring force.

In various implementations, the first increment marker comprises a first notch or alternatively a first protruding portion in the incremented member, and the engaging member comprises a portion configured to extend into the first notch or engage the first protruding portion when the engaging member and the incremented member are positioned at approximately the first relative displacement. In an implementation where the incremented member includes additional increment markers, these may comprise additional notches or protruding portions in the incremented member.

In various implementations, a stop arrangement is provided that is configured to provide a maximum relative displacement limit between the force actuator and the one of the incremented member and the engaging member that is coupled to the caliper jaw, such that deformation of the compliant element is limited to substantially exclude plastic deformation of the compliant element. The stop arrangement is configured to transmit additional force between the force actuator and the caliper jaw once the maximum relative displacement limit is reached.

In various implementations, the force indicator arrangement is configured to mount to the caliper jaw of existing calipers using a fastening configuration that is compatible with existing mounting features on the caliper jaw. In instances where the existing calipers do not include a force actuator, the force indicator arrangement includes the force actuator, and the force actuator is retrofitted to the existing calipers as part of the force indicator arrangement.

In various implementations, the force indicator arrangement is included with a set of interchangeable force indicator arrangements, wherein each respective force indicator arrangement in the set provides a respective compliant element having a different respective spring rate. In addition or alternatively, at least one respective force indicator arrangement in the set provides a different first incremented section having a different respective size corresponding to a different first relative displacement in comparison to other members of the set, in order to indicate a first respective measuring force that is different in comparison to that indicated by other members of the set.

In various implementations, the compliant element is made to be rigid enough to provide a reasonable resistance force (e.g., 0.1 to 10 N) while being compliant enough to give a reasonable amount of deflection (e.g., 0.5 to 5 mm). In one implementation, a compliant element is utilized that has a spring rate rating of 0.25 N/mm to 6 N/mm, in order to provide certain ergonomic characteristics. The spring rate rating is also selected to be sufficient for returning the force indicator arrangement to a zero-position after a measuring process is complete.

BRIEF DESCRIPTION OF THE DRAWINGS

FIGS. 4A-4C are top view diagrams of a set of compliant elements of different stiffnesses or spring rates.

FIGS. 5A-5C are top view diagrams of a set of incremented sections with different numbers and spacings of increment markers.

FIGS. 6A and 6B are diagrams of a second embodiment of a force indicator arrangement.

DETAILED DESCRIPTION

Figure 1:
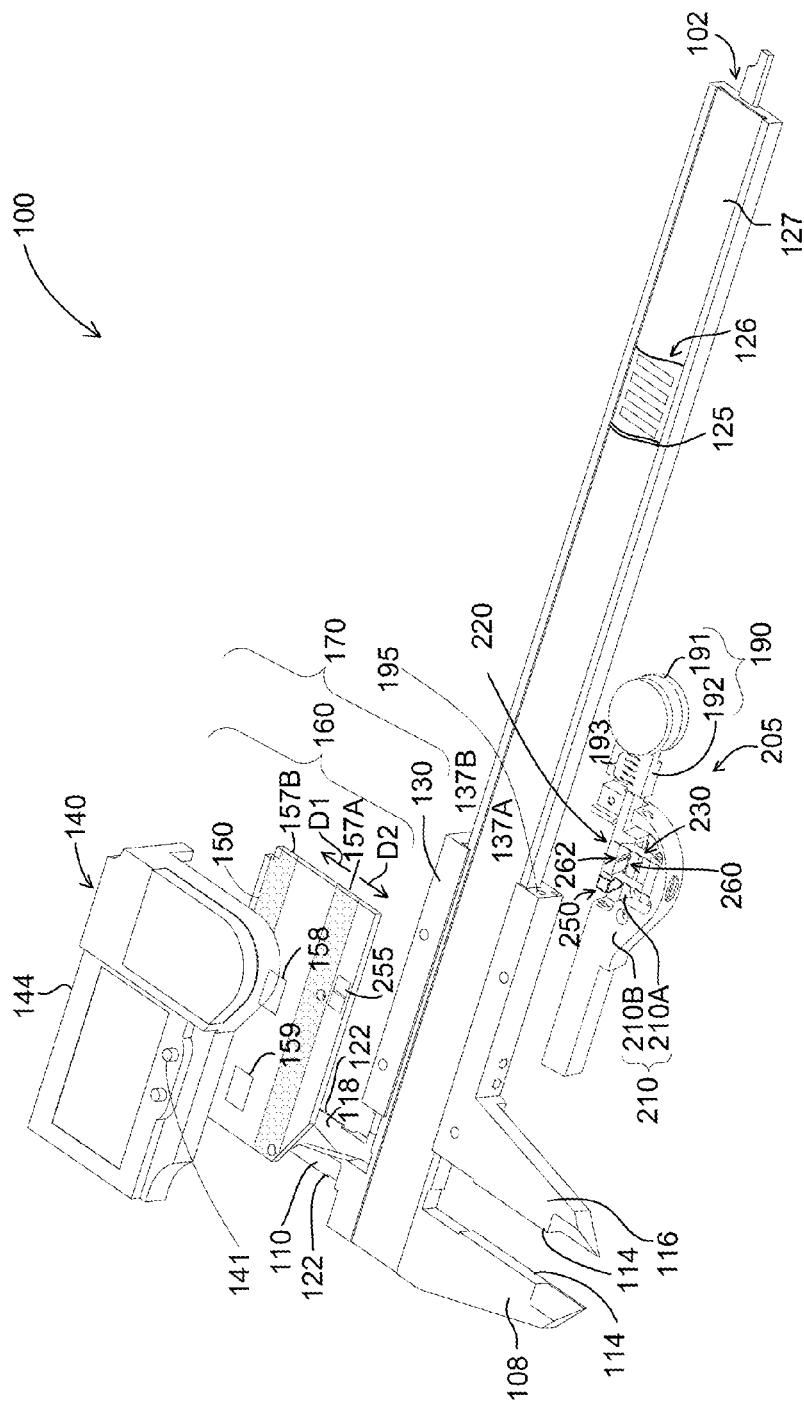
FIG. 1 is an exploded isometric view diagram of a hand tool type caliper including a scale and slider with a first embodiment of a force indicator arrangement.

FIG. 1 is an exploded isometric view diagram of a hand tool type caliper 100 with a force indicator arrangement 205. In this example, the caliper 100 comprises a slider displacement sensor 158 (e.g., an inductive sensor assembly) and a scale substrate 125 including a scale track 126 (a cut-away segment of each is illustrated) positioned in a groove 127 along an elongated scale member 102. In other embodiments other types of slider displacement sensors 158 may be utilized (e.g., capacitive, etc.) A slider assembly 170 includes an electronic assembly 160 attached to a slider 130. The slider displacement sensor 158 is included in the electronic assembly 160. The mechanical structure and operation of the caliper 100 may be similar to that of certain prior electronic calipers, such as that of commonly assigned U.S. Pat. No. 5,901,458, which is hereby incorporated herein by reference in its entirety. The scale member 102 is a rigid or semi-rigid bar which may include grooves and/or other features incorporated into a generally rectangular cross section. The scale substrate 125 may be rigidly bonded in the groove 127, and the scale track 126 may include scale elements that cooperate with corresponding elements (not shown) of the slider displacement sensor 158, in a manner similar to that used in known electronic calipers and as described in the previously incorporated RE37490 and U.S. Pat. No. 5,901,458, and in commonly assigned U.S. Pat. No. 6,400,138, which is incorporated herein by reference in its entirety.

A pair of jaws 108 and 110 are formed near a first end of the scale member 102. A corresponding pair of jaws 116 and 118 are formed on the slider 130. The outside dimensions of a workpiece are measured by placing the workpiece between a pair of engagement surfaces 114 of the jaws 108 and 116. Similarly, the inside dimensions of a workpiece are measured by placing a pair of engagement surfaces 122 of the jaws 110 and 118 against opposing internal surfaces of the workpiece. In a position sometimes called the zero position, the engagement surfaces 114 abut one another, the engagement surfaces 122 are aligned, and both the outside and inside dimensions measured by the caliper 100 may be indicated as zero.

The measured dimension may be displayed on a digital display 144, which is mounted within a cover 140 of the electronic assembly 160 of the caliper 100. The electronic assembly 160 may also include a push button switch 141 (e.g., an "origin" switch), and a signal processing and display circuit board 150. The signal processing and display circuit board 150 may comprise a readhead signal processing and control circuit 159. As shown in FIG. 1, the bottom surface of the signal processing and display circuit board 150 may be mounted to abut the top surfaces of the slider 130 on either side of the scale member 102.

The force indicator arrangement 205 includes an incremented member 210 which comprises an incremented portion 210A and in this embodiment further comprises a coupling portion 2108, an engaging member 220 which comprises an engaging feature 262 that engages the incremented portion 210A, and a compliant or compliant element 230. The incremented member 210 is coupled to the slider 130 (e.g. by screws) and thereby to the corresponding jaws 116 and 118. The engaging member 220 is coupled to the actuator assembly 190. The compliant element 230 is coupled between the incremented member 210 and the engaging member 220, and thereby couples forces between the force actuator and the caliper jaw(s) on the slider 130. As will be described in more detail below with respect to FIGS. 2-5, the incremented member 210 (e.g. its incremented portion 210A) includes a plurality of incremented sections 260 with increment markers for being engaged by the engaging feature 262 of the engaging member 220. In an alternative implementation, the member 210 may be made to include the engaging feature 262 (which may then be referenced as the engaging member 210) and the member 220 may be made to include the incremented sections 260 (which may then be referenced as the incremented member 220).

In various implementations, the compliant element 230 may consist of parallel spring elements, as will be described in more detail below with respect to FIG. 2. The parallel spring elements may be relatively rigid and correspondingly act to restrain the force actuator assembly 190 from displacement relative to the caliper jaw along directions transverse to the measuring axis direction. In this manner, the compliant element 230 may act as both a guiding mechanism for the force actuator assembly 190, as well as providing a resistance force, as will be described in more detail below.

In operation, a user may push on the thumb wheel 191 of the force actuator assembly 190 so as to apply a force to the force actuator to move the slider 130 toward the first end of the scale member 102 along the measuring axis direction. The compliant element 230 flexes or deforms such that a force actuator body 192 of the force actuator assembly 190 and the coupled engaging member 220 displaces along the measuring axis direction relative to the incremented member 210 and the slider 130 and corresponding caliper jaws 116 and 118. A measuring force is generated in the compliant element 230 that depends on that forced relative displacement, and it is applied through the compliant element 230 to the incremented member 210 and the slider 130 and corresponding caliper jaws 116 and 118 along the measuring axis direction. As described in greater detail below, when the forced relative displacement includes a certain first relative displacement, at least one of the engaging or disengaging of the engaging feature 262 of the engaging member 220 with a first increment marker 261 of the incremented member 219 results in at least one of a tactile or auditory feedback being produced to indicate a corresponding first respective measuring force.

The utilization of the force indicator arrangement 205 with the compliant element 230 allows a gradual increase or decrease in force to occur over a range of positions. Importantly, this results in more control and a better "feel" for a user when attempting to exert control to provide a desired amount of force during a measuring process. As described in more detail below, as the compliant element 230 flexes the force indicator arrangement 205 is configured to produce one or more tactile and/or audible indications (e.g. clicks) as the engaging feature 262 moves along the range of incremented sections 260. By providing tactile and/or auditory feedback, a user is not required to observe a force indication while also trying to observe a measurement of the caliper.

In some embodiments, the features outlined above may be combined with an optional electronic force element displacement sensor (also referred to as a force sensor) as illustrated in the particular embodiment shown in FIG. 1. The force sensor includes an arrangement of displacement signal elements 255 and a signal modulating element 250 that is coupled to the force actuator assembly 190 (e.g. through intervening coupling elements). A similar force sensor is described in more detail in co-pending and commonly assigned U.S. patent application Ser. No. 14/194,320 (hereinafter the "'320 application"), titled "Displacement Sensor For Force Indicating Caliper", filed Feb. 28, 2014, which is hereby incorporated by reference in its entirety. In one implementation the arrangement of displacement signal elements 255 is fabricated in one or more metal layers of the circuit board 150 and produces electrical signals that indicate the position of the signal modulating element 250. The read head signal processing and control circuit 159 includes a force sensing circuit which receives the force sensing signals from the signal elements 255 for determining force measurements. As a user pushes the thumb wheel 191 so as to move the slider 130 toward the first end of the scale member 102, the force actuator assembly 190 and attached signal modulating element 250 are pushed forward so as to move in a guided fashion relative to the arrangement of displacement signal elements 255. The signal modulating element 250 is arranged with a relatively small gap proximate to the displacement signal elements 255 such that they sense its relative position. The position of the signal modulating element 250 corresponds to the amount of flex of the compliant element 230 of the force indicator arrangement 205, and is therefore indicative of the corresponding measuring force.

In various implementations, the circuit board 150 may abut the slider 130 at one or more mounting regions of the circuit board 150. For example, as shown in FIG. 1, the circuit board 150 may have mounting regions 157A and 157B which abut corresponding mounting regions 137A and 137B on the slider 130. A conductive signal sensing element (not shown) of the slider displacement sensor 158 may overlap the scale member 102 in a scale track 126 located in a first lateral direction D1 away from the mounting region 157A. Furthermore, at least one conductive signal sensing element of the arrangement of displacement signal elements 255 may be arranged in a region located in an opposite lateral direction D2 away from the mounting region 157A. In this configuration, the metal slider 130 may, in addition to its usual slider functions, also act to shield simultaneous signals for the slider displacement sensor 158 and the force sensor 255 from one another. Various considerations related to force sensing operations in a caliper are described in co-pending and commonly assigned U.S. patent application Ser. No. 13/706,225 (hereinafter the "'225 application"), titled "System and Method for Setting Measurement Force Thresholds in a Force Sensing Caliper", filed Dec. 5, 2012, which is hereby incorporated by reference in its entirety.

Figure 2:
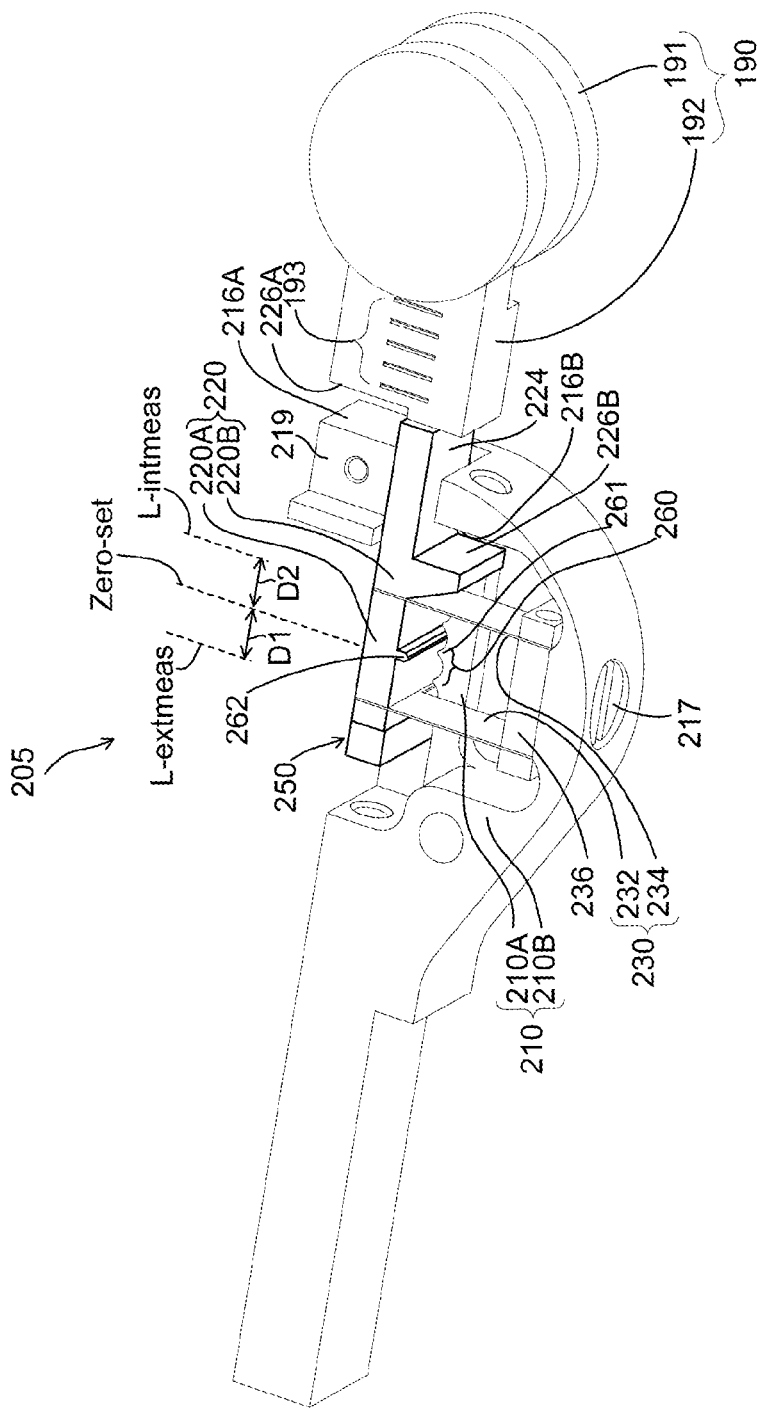
FIG. 2 is an isometric view diagram of the force indicator arrangement of FIG. 1.
Figure 3:
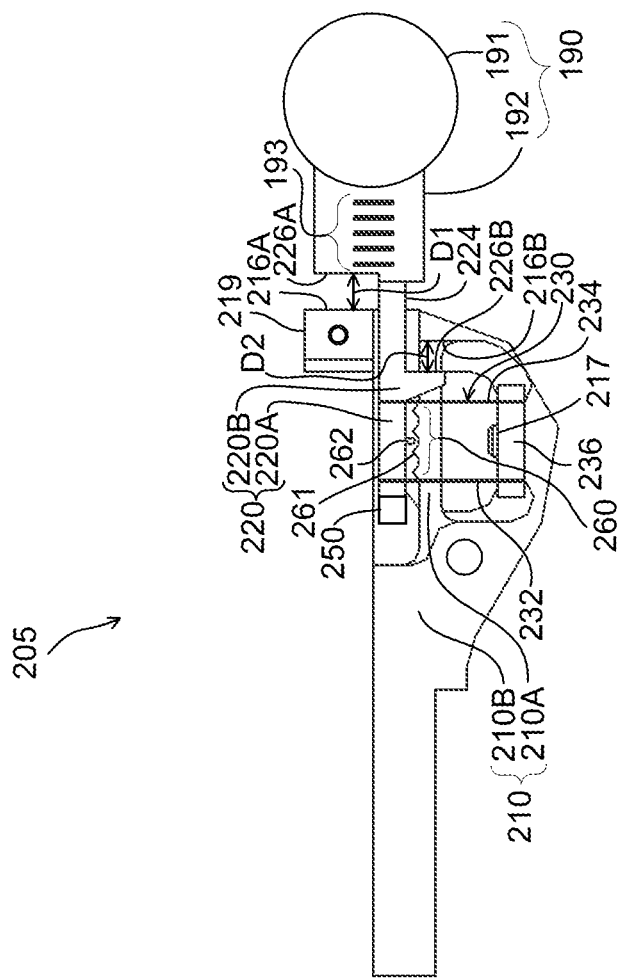
FIG. 3 is a top view diagram of the force indicator arrangement of FIG. 1.

FIG. 2 is an isometric view diagram and FIG. 3 is a top view diagram of the force indicator arrangement 205 and force actuator assembly 190 of FIG. 1. As shown in FIGS. 2 and 3, this embodiment of the compliant element 230 includes a first spring element 232 and a second spring element 234 coupled between the incremented member 210 and the engaging member 220. The spring elements 232 and 234 may function as a parallelogram spring suspension.

As shown in FIGS. 2 and 3, a first coupling portion 236 may be rigidly fastened or coupled to one end of the spring elements 232 and 234, and to the mounting portion 210A of the incremented member 210 utilizing a fastener 217 (e.g. the fastener 217 may be screwed into the coupling portion 236). The mounting portion 210A includes an attachment portion 219 for being attached to the slider 130. In general, the sliders and associated jaws of existing calipers have specified dimensions, and features to which external elements may be mounted, and in various implementations the mounting portion 210A is configured for being mounted utilizing a fastening configuration that is compatible with the existing mounting features on existing calipers. Certain existing calipers may not include a force actuator assembly 190, in which case the force actuator assembly 190 may be retrofitted to the existing calipers utilizing the force indicator arrangement 205.

The second end of the spring elements 232 and 234 may be fastened to an engaging portion 220A and/or a coupling portion 220B of the engaging member 220, using a fastener (not shown) and/or a bonding method, or the like. The engaging member 220 (e.g. the coupling portion 220B) may be coupled to an actuator body coupling portion 224 which is coupled to the actuator body 192. The signal modulating element 250 is attached so as to move with the engaging member 220 and the actuator body coupling portion 224.

In various implementations described herein, the force indicator arrangement 205 is configured to provide tactile and/or auditory feedback regarding a measuring force that is being applied by a user. In one specific example implementation, the incremented member 210 includes a plurality of incremented sections 260 with increment markers 261 for being engaged by the engaging feature 262 of the engaging member 220. The engaging member 220 including the engaging feature 262 is coupled so as to move with the force actuator assembly 190 and the second end of the compliant element 230. In operation, as the compliant element 230 flexes so as to allow the actuator assembly 190 to move relative to the incremented member 210, the engaging feature 262 moves relative to the range of incremented sections 260, so as to provide an indication of the measurement force. The force indicator arrangement 205 is configured to produce one or more tactile and/or audible indications (e.g. clicks) as the engaging feature 262 is moved along the range of incremented sections 260. For example, the engaging feature 262 may comprise a protruding feature such as a ridge, and the increment markers 261 may comprise a series of raised portions or peaks traversed by the engaging feature 262, such that a "click" is produced as the engaging feature 262 snaps over each of the increment markers 261. In various implementations, different ranges of incremented sections 260 and/or increment markers 261 may be provided, as will be described in more detail below with respect to FIGS. 5A-5C. In one implementation, a redundant visual force indicator may include a range of markings 193 on the force actuator body 192, if desired.

In one example configuration, the operation of the caliper 100 and the force indicator arrangement 205 may be described as follows. The caliper may begin at a position zero-set, as illustrated in FIG. 2. At the position zero-set, the caliper is generally in the middle of a bi-directional measurement range, where the compliant element 230 (e.g., a parallelogram spring suspension) is not flexed. At the position zero-set, the signal modulating element 250 may be approximately in the middle of the range of the arrangement of displacement signal elements 255, and the engaging feature 262 may be approximately in the middle of the range of incremented sections 260.

When a user pushes on the thumb wheel 191 so as to move the slider 130 toward the first end of the scale member of the caliper 100, the compliant element 230 flexes forward, and a limit position L-extmeas may be reached. The limit position L-extmeas may correspond to a desired external measurement force limit (e.g., for measuring the external dimensions of a workpiece). As described in more detail below with respect to FIGS. 5A-5C, between the position zero-set and the limit position L-extmeas, tactile and/or auditory feedback may be provided by the engaging feature 262 moving over increment markers 261 (e.g., a "click" being produced as each increment marker 261 which is indicative of a corresponding amount of measuring force is engaged and/or disengaged).

In various implementations, a stop arrangement may be provided, slightly beyond the limit position L-extmeas. For example, a surface 226A that is fixed to the engaging member 220 may contact a surface 216A that is fixed to the incremented member 210 and prevent further relative motion or flexing of the compliant element 230 in the forward direction. This may correspond to the signal modulating element 250 reaching a first end of the sensing range of the displacement signal elements 255 and/or the engaging feature 262 reaching a first end of the range of incremented sections 260.

Similarly, when the thumb wheel 191 is moved by a user in the opposite direction, (i.e., so as to reverse the direction of the slider 130 toward the opposite end of the scale member of the caliper 100), the compliant element 230 flexes backward. In this direction, a limit position l-intmeas may be reached which may correspond to an internal measurement limit (e.g., for measuring the internal dimensions of a workpiece). Between the position zero-set and the limit position l-intmeas, tactile and/or auditory feedback may be provided by the engaging feature 262 moving over the increment markers 261. A corresponding stop arrangement may include a surface 226B that is fixed to the engaging member 220 which contacts a surface 216B that is fixed to the incremented member 210 to prevent further flexing of the compliant element 230 in the reverse direction. This correspond to the signal modulating element 250 reaching a second end of the sensing range of the displacement signal elements 255 and/or the engaging feature 262 reaching a second end of the range of incremented sections 260.

The stop arrangements outlined above are configured to provide a maximum relative displacement limit for the force actuator assembly 190. When the caliper 100 is in the zero-set position, the surfaces 216A and 226A are separated by a distance D1, while the surfaces 216B and 226B are separated by a distance D2. These distances D1 and D2 thus correspond to the differences from the position zero-set to the limit positions L-extmeas and l-intmeas, respectively. Once these limit positions L-extmeas and l-intmeas are reached, contact of the corresponding surfaces 216A, 226A and 216B, 226B transmits any additional force applied by the user on the force actuator assembly 190 directly to the slider 130 rather than further deforming the compliant element 230. In various implementations, this limits the deformation of the compliant element 230 to substantially exclude plastic deformation of the compliant element 230.

In various implementations, different features and materials may be utilized for the compliant element 230. In general, it is desirable for the compliant element 230 to be rigid enough to provide a reasonable resistance force (e.g., 0.1 to 10 N) while being compliant enough to give a reasonable amount of deflection (e.g., 0.5 to 5 mm). For various embodiments, it has been experimentally determined that it may be desirable to use a compliant element 230 that has a spring rate rating of 0.25 N/mm to 6 N/mm, to provide certain ergonomic characteristics. It should be appreciated that while applying a controlled force when using a caliper, generally some fingers of a hand grip the caliper scale (thus fixing most of the hand relative to the caliper), a finger may also wrap around the slider, and a thumb may move relative to the hand to adjust the force actuator relative to the slider. Thus, the convenient amount of thumb travel is limited, relative to the remainder of the hand. In general, the 0.25 N/mm limit ensures that a useful amount of force variation may be provided within a convenient and comfortable amount of thumb travel relative to the remainder of the hand, while the upper limit of 6 N/mm ensures that the force variation with a small motion of the thumb is not so great that the user finds it too sensitive for easy and stable control. In other words, it has been experimentally determined that this spring rate range provides a user with a desirable measurement feel. The incremented sections 260 may be sized accordingly. Through the use of levers or gears or other known machine elements, the relationship between finger displacement and force may be changed such that other springs rates (e.g., in the range of 0.05 to 20 N/mm) may be used in other embodiments.

In one specific example, steel shims may be utilized for the first and second spring elements 232 and 234 in order to achieve a desired spring rate. In other implementations, other material types (e.g., a resilient polymer material) may be used to provide the compliant element 230, which may be formed as a combination of parts or elements (e.g., a stamped metal flexure molded into a polymer part) or as a single element (e.g., a single molded part) to reduce the parts count and assembly cost. In one implementation, a compound flexure may be utilized for the compliant element 230 with a resulting increase in the available flex range.

It will be appreciated that the embodiments of the engaging member, incremented member, compliant element, and force actuator assembly 190, outlined above are exemplary only and not limiting. Various elements shown as portions of monolithic or integrated structures may instead comprise assembled elements. Conversely, assembled elements may instead be provided within monolithic or integrated structures. Various alternative shapes and forms may be used to implement the principles disclosed herein.

FIGS. 4A-4C are diagrams of a set of compliant elements 230A-230C with parallel spring elements of different thicknesses that may be included in a set of corresponding force indicating arrangements. As shown in FIG. 4A, the compliant element 230A includes first and second spring elements 232A and 234A that are thinner than the first and second spring elements 232B and 234B of the compliant element 230B of FIG. 4B. Similarly, the first and second spring elements 232B and 234B are thinner than the first and second spring elements 232C and 234C of the compliant element 230C. The different thicknesses of the first and second spring elements of each of the compliant elements 230A, 230B and 230C correspond to different spring rates.

As described above, in various implementations respective force indicating arrangements with the corresponding compliant elements 230A-230C may be configured for attachment to existing calipers utilizing a fastening configuration that is compatible with existing mounting features on the caliper jaw and slider. By providing a set of respective force indicating arrangements with the compliant elements 230A-230C, a user may select a force indicator arrangement with a spring rate that is appropriate for a specific application. In an alternative implementation, rather than changing the thickness of the first and second spring elements 232 and 234, other dimensions (e.g., the height) of the compliant element 230 may instead be changed.

FIGS. 5A-5C are diagrams of a set of incremented portions 210AA-210AC with different numbers incremented sections 260 and spacings of increment markers 261 that may be included in a set of corresponding force indicator arrangements. As shown in FIG. 5A, the incremented portion 210AA comprises incremented sections 260 including a first polarity incremented section ES1A on a first side of a zero-set position, and second polarity incremented section IS1A on a second side of the zero-set position. The first polarity incremented section ES1A has a corresponding first polarity increment marker EM1A and the second polarity incremented section IS1A has a corresponding second polarity increment marker IM1A. In various implementations, the first polarity incremented section ES1A may correspond to an external dimension measurement, while the second polarity incremented section IS1A may correspond to an internal dimension measurement, as described above with respect to FIG. 2.

In one specific example, as an engaging feature 262 moves between positions in which it is engaged (e.g. in position 262") and disengaged (e.g. in position 262') from one of the increment markers 261 (e.g. the marker EM1A or IM1A), a tactile and/or auditory feedback (e.g., a "click") may be produced by the release of stored energy associated with the changing interference and/or deformation of the engaging features 262 and/or the increment markers 261. A click or other feedback that is perceived by a user may indicate a corresponding increment of measuring force, which may dictate a user action. For example, where a click is indicates that an appropriate amount of measuring force is currently being applied, a user may stop increasing the measuring force once that click is felt or heard. Where a click is indicates that too much measuring force is being applied, the user may decrease the measuring force, and so on.

In various implementations, the size and locations of the incremented sections and/or increment markers may be selected and positioned for indicating specific amounts of measurement force. In one implementation, the locations of the incremented sections and/or increment markers may be adjustable by a user so as to adjust the amount of measurement force that is indicated. For example, one or both of the increment markers EM1A or IM1A may be carried on one or more adjustable elements that a user may reposition so that the tactile and/or auditory feedback may occur at a different amount of measurement force. As will be described in more detail below with respect to FIGS. 5B and 5C, in certain implementations multiple increment markers may also be provided within a range of incremented sections so that different numbers of clicks may correspond to different measuring force levels (e.g., various levels of too little measuring force, appropriate measuring force and/or too much measuring force being applied).

As shown in FIG. 5B, the incremented portion 210AB includes first polarity incremented sections ES1B and ES2B on a first side of a zero-set position, and second polarity incremented sections IS1B and IS2B on a second side of the zero-set position. The first polarity incremented sections ES1B and ES2B have corresponding first polarity increment markers EM1B and EM2B, respectively. The second polarity incremented sections IS1B and IS2B have corresponding second polarity increment markers IM1B and IM2B, respectively. In this configuration, a first click may be designated as indicating a first measuring force, and a second click may be designated as indicating a second measuring force. For example, in one specific implementation a first click in a first direction (for either the first or second polarity) may be designated as indicating that an appropriate amount of measuring force is being applied, while a second click in the first direction may be designated as indicating that too much measuring force is being applied.

As shown in FIG. 5C, the incremented portion 210AC includes first polarity incremented sections ES1C, ES2C and ES3C on a first side of a zero-set position, and second polarity incremented sections IS1C, IS2C and IS3C on a second side of the zero-set position. The first polarity incremented sections ES1C, ES2C and ES3C have corresponding first polarity increment markers EM1C, EM2C and EM3C, respectively. The second polarity incremented sections IS1C, IS2C and IS3C have corresponding second polarity increment markers IM1C, IM2C and IM3C, respectively. In this configuration, a first click may be designated as indicating a first measuring force, a second click may be designated as indicating a second measuring force, and a third click may be designated as indicating a third measuring force. For example, in one specific implementation a first click in a first direction may be designated as indicating that too little measuring force is being applied, while a second click in the first direction may be designated as indicating that an appropriate amount of measuring force is being applied, and a third click in the first direction may be designated as indicating that too much measuring force is being applied. Another example of a force indicator arrangement in which three clicks may be produced in both of the first and second polarity directions will be described in more detail below with respect to FIGS. 6A and 6B.

As described above, a set of force indicating arrangements with the corresponding incremented portions 210AA-210AC may be configured for attachment to existing calipers utilizing a fastening configuration that is compatible with existing mounting features on a caliper. A user may select a force indicator arrangement with incremented sections and corresponding increment markers that are appropriate for a specific application. While the incremented portions 210AA-210AC illustrate different numbers of increment markers, in other implementations a set of incremented portions may also or alternatively include incremented sections with the same number of increment markers at different spacings. In general, it will be appreciated that a set of force indicating arrangements may be provided with any number of incremented sections and/or compliant element spring rate (e.g., compliant elements 230A-230C) and/or any combinations thereof.

FIGS. 6A and 6B are diagrams of a second embodiment of a force indicator arrangement 605, including an incremented member 610, an engaging member 620 and a compliant element 630. Various components of the incremented member 610, engaging member 620 and compliant element 630 may be similar to similarly numbered components of the incremented member 210, engaging member 220 and compliant element 230 of FIGS. 1-3, and will be understood to function in a similar manner except as otherwise described below.

As shown in FIGS. 6A and 6B, the incremented member 610 includes an incremented portion 610A similar to the previously describe incremented portion 210A and a coupling portion 610B that includes an attachment portion 619 for being attached to a slider 130 of a caliper 100 (FIG. 1). Thus, the incremented member 610 is configured for being mounted utilizing a fastening configuration that is compatible with mounting features on existing calipers. In addition, the force actuator assembly 190 may be retrofitted to certain existing calipers utilizing the force indicator arrangement 605.

The engaging member 620 includes an engaging portion 620A and is fastened to the force actuator body 192' of the force actuator assembly 190 at a coupling portion 620B and moves with it. The force actuator body 192' is received and guided in a groove 613 in the coupling portion 610B of the incremented member 610, and retained therein by a screw or pin 612 which is extends through a slot 611 in the coupling portion 610B. The screw or pin 612 may move freely along the measuring axis direction in the slot 611, so that the force actuator assembly 190 and the engaging member 620 may move relative to the incremented member 610, approximately as shown.

In various implementations, the compliant element 630 may consist of a helical spring coupled to the elements 190 and 610 in the groove 613 by the pins P2 and P1, approximately as shown. Alternative configurations for connecting a spring-type compliant element are described in the previously incorporated '225 application. In this configuration, when a user pushes on the thumb wheel 191 so as to move the slider 130 toward the first end of the scale member 102, the compliant element 630 is compressed (e.g., for the measurement of the outside dimensions of a workpiece). When a user moves the thumb wheel 191 in the opposite direction (i.e., so as to reverse the direction of the slider 130 toward the opposite end of the scale member 102), the compliant element 630 is extended (e.g., for the measurement of the inside dimensions of a workpiece.) In this manner, a bi-directional measurement configuration is achieved through the compliant element 630. It will be appreciated that the screw or pin 612 in the slot 611 may be configured to provide a bidirectional stop arrangement, which limits the relative displacement of the force actuator assembly 190 and the compression and extension of the compliant element 630.

The incremented member 610 includes a plurality of incremented sections 660 with increment markers 661 for being engaged by an engaging portion 662 of the engaging member 620. In an alternative implementation, the member 610 may be made to include the engaging portion 662 (which may then be referenced as the engaging member 610) and the member 620 may be made to include the incremented sections 660 (which may then be referenced as the incremented member 620). As described above, a user may move the thumbwheel 191 to exert measuring force by deforming the compliant element 630 and correspondingly moving the engaging member 620 relative to the incremented member 610. In the example of FIG. 6A, this movement results in the engaging portion 662 being moved along the range of incremented sections 660 which produces one or more tactile and/or audible indications (e.g. clicks) to indicate the amount of measuring force being applied.

As illustrated in FIG. 6A, the engaging portion 662 may comprise an extended portion that is biased to extend downward and "click" into notched portions of the incremented sections 660 as the engaging portion 662 is moved along the incremented sections 660. In one implementation, the increment markers 661 may be designated as being the notched portions, while in another embodiment the increment markers may be designated as being the raised portions in between each of the notched portions. In either case, different ranges of incremented sections 660 and/or increment markers 661 may be provided in various implementations, similar to as described above with respect to FIGS. 5A-5C. Similar to the example of FIG. 5C, in the example of FIG. 6A the incremented sections 660 are configured so that three clicks may be produced in each of the first and second polarity directions.

Similar to the implementations for the force indicator arrangement 205 described above, the incremented sections 660, increment markers 661, engaging portion 662 and compliant element 630 of the force indicator arrangement 605 may be configured and/or selected according to various parameters for particular implementations. For example, in various implementations it may be desirable to have a selected amount of measuring force correspond to each click (e.g., 0.1-10N), to have a selected number of clicks be available in either direction within the range of motion, and for the range of motion to be reasonable given the size of the caliper (e.g., having the range of motion be between 0.5 to 5 mm in each direction). The compliant element 630 may be selected to have a spring rate rating that ensures that the force indicator arrangement 605 returns to a zero-position after each use. The shapes and sizes of the incremented sections 660, increment markers 661 and engaging portion 662 may all be selected to provide a desired "feel" for a user and proper seating for each click, and materials for the components may be chosen for longevity as well as smooth operation. The incremented sections 660 and increment markers 661 may be configured with different numbers and/or spacings so that the force change between clicks is at a specified level. The force of each click may be designated so that each click is noticeable to a user but not so large that excess force is required to go to the next increment marker 661. In various implementations, the clicks may be designed to provide a "micro vibration" that helps a workpiece that is being measured seat between the jaws of the caliper.

Figure 7:
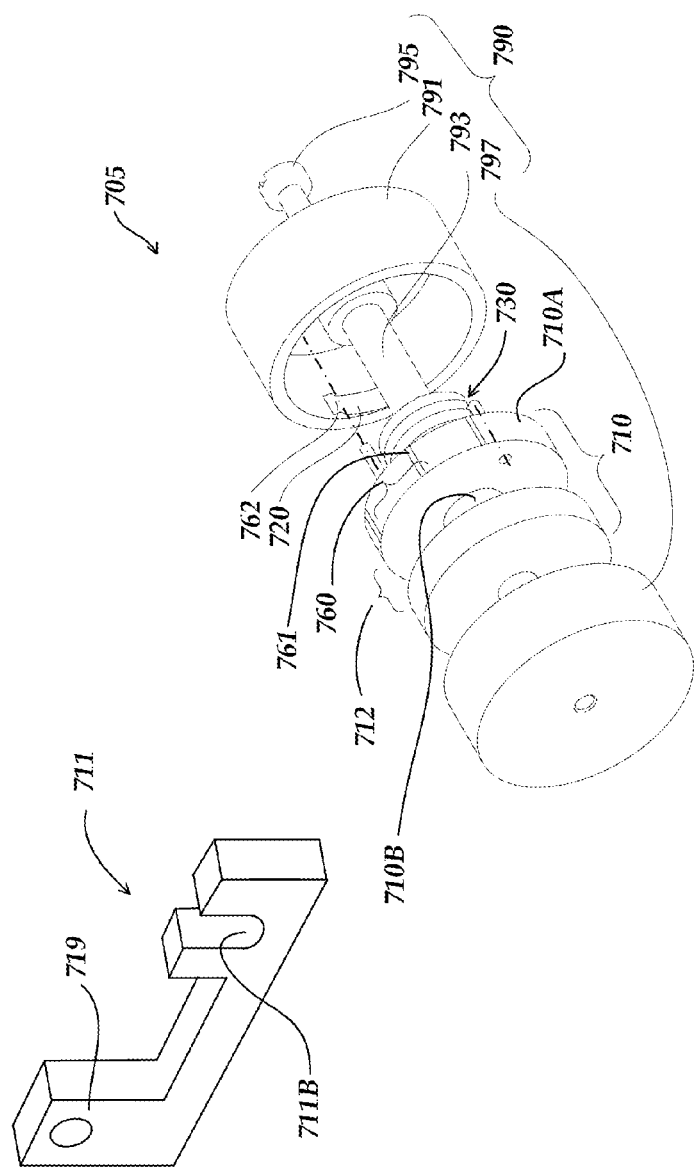
FIG. 7 is a diagram of a third embodiment of a force indicator arrangement.

FIG. 7 is a diagram of a third embodiment of a force indicator arrangement 705 that is coupled to a rotary force actuator 790, and may be implemented as part of a (retrofittable) type of thumbwheel assembly. A similar thumbwheel assembly is described in more detail in co-pending and commonly assigned U.S. patent application Ser. No. 14/194,461 (hereinafter the "'461 application"), titled "Wheel Assembly For Moving Caliper Jaw With Repeatable Force", filed Feb. 28, 2014, which is hereby incorporated by reference in its entirety. A configuration approximately as shown in FIG. 7 may be compatible with the existing mounting features on the sliders and associated caliper jaws of existing calipers. Certain existing calipers may not include a force actuator assembly, in which case the force actuator assembly 790 may be retrofitted to the existing calipers utilizing the force indicator arrangement 705.

The force indicator arrangement 705 includes an incremented member 710, an engaging member 720 and a compliant element 730. It will be appreciated that various components of the incremented member 710, engaging member 720 and compliant element 730 may provide analogous functions to similarly numbered components of the incremented member 210, engaging member 220 and compliant element 230 of FIGS. 1-3, and will be understood to function in a similar manner except as otherwise described below.

As shown in FIG. 7, the rotary force actuator 790 comprises rotary actuator portions 791 and 797, assembly screw 795, and an optional hub/spacer 793. In various implementations, the rotary actuator portions 791 and 797 may be rigidly coupled together (e.g. against the hub/spacer 793) by the assembly screw 795 to form a rotary force actuator 790 (e.g., an outer thumb wheel portion) that is actuated by a user to apply measuring force, as will be described in more detail below. In one embodiment, the assembly screw 795 is fastened into threads in the actuator portion 797, and has an unthreaded length configured to provide an axial clearance between components assembled thereon, such that the incremented member 710 may pivot freely relative to the actuator portions 791 and 797 after the assembly screw 795 is tightened. In one implementation, the rotary actuator portion 791 may be omitted, and the compliant coupling element 730 may be repositioned (and reconfigured if needed) to couple the rotary actuator portion 797 to the incremented member 710. The screw/axle 795, and/or the hub/spacer 793 may be reconfigured if needed, to hold the resulting assembly together in an operational manner as outlined above.

The incremented member 710 comprises two disk-like portions joined by a hub. One of the disk-like portions provides an incremented portion 710A which provides a rotary analog to the previously described linear incremented portion 210A (see FIG. 2). The hub provides a coupling portion 710B that is accepted in slot 711B in a coupling element 711 that includes an attachment portion 719 for being attached to a slider 130 of a caliper 100 (FIG. 1). When assembled as outlined above and fastened to the slider 130, an edge of the caliper scale member (or spar) 102 is thereby positioned to frictionally engage the sides of a wedge-shaped spar engagement gap 712 of the incremented member 710. The hub/coupling portion 710B will be trapped in the slot 711B by the caliper spar, and as the incremented member 710 is rolled along the edge of the caliper spar 102, the hub/coupling portion 710B will push on the coupling element 711 (via the slot 711B) and thereby exert a force on the slider 130 along the measuring axis direction. The incremented portion 710A includes a plurality of incremented sections 760 with increment markers 761 for being engaged by an engaging feature 762 of the engaging member 720.

The compliant coupling element 730 is configured to elastically couple the rotary actuation member 790 to the incremented member 710. The compliant element 730 is illustrated as comprising a torsion spring with a first end portion received in a restraining hole of the rotary actuator portion 791, while a second end portion is received in a restraining hole of the incremented member 710, so as to elastically couple the rotary actuator portion 791 to the incremented member 710. While the compliant element 730 is illustrated in FIG. 7 as consisting of a torsion spring, it will be appreciated that other components may be utilized in other implementations (e.g., an elastomeric torsion spring, a helical spring arranged in an arc about an axis of rotation of the wheel assembly, a flexure pivot, etc.)

The engaging member 720 is coupled (e.g. bonded) to the rotary actuator portion 791 of the force actuator assembly 190 and moves with it. In operation, a user may move or roll the thumbwheel/rotary actuator portion 791 to roll the incremented member 710 along the caliper spar edge until the coupled slider and caliper jaw engage a workpiece, and then exert a measuring force by deforming the compliant element 730 by further rotating the thumbwheel/rotary actuator portion 791 relative to the incremented member 710, as the rotation/travel of the incremented member 710 is restrained by the coupled slider and jaw stopping against the workpiece. In the example of FIG. 7, this relative rotation results in the engaging portion 762 being moved along the range of incremented sections 760 which produces one or more tactile and/or audible indications (e.g. clicks) to indicate the amount of measuring force being applied. In an alternative implementation that operates in an analogous manner, a suitable engaging portion 762 made be located on or coupled to the member 710 (which may then be referenced as the engaging member 710) and incremented sections 760 and markers 761 may be located on the interior surface of the member 720 (which may then be referenced as the incremented member 720).

In any case, different ranges of incremented sections 760 and/or increment markers 761 may be provided in various implementations, analogous to those described above with respect to FIGS. 5A-5C. Similar to the implementations for the force indicator arrangements described previously, the incremented sections 760, increment markers 761, engaging portion 762 and compliant element 730 of the force indicator arrangement 705 may be configured and/or selected according to various parameters for particular implementations. For example, in various implementations it may be desirable to have a selected amount of measuring force correspond to each click (e.g., 0.1-10 N), to have a selected number of clicks be available in either direction within the range of motion, and for the range of motion to be reasonable given the size of the caliper (e.g., having the range of motion be between 0.5 to 5 mm in each direction, at the radius of the member 710). The compliant element 730 may be selected to have a spring rate that ensures that the force indicator arrangement 705 returns to a zero-position after each use. A set of compliant elements, and/or force indicator arrangements, and/or rotary actuators may be provided wherein each member of the set provides a different spring rate for the compliant element. The shapes and sizes of the incremented sections 760, increment markers 761 and engaging portion 762 may be selected to provide a desired "feel" for a user and proper seating for each click, and materials for the components may be chosen for longevity as well as smooth operation. The incremented sections 760 and increment markers 761 may be configured with different numbers and/or spacings so that the force change between clicks is at a specified level. The force of each click may be designated so that each click is noticeable to a user but not so large that excess force is required to go to the next increment marker 761.

The various components described above may be positioned differently and take other forms than those outlined above, as will be appreciated by one of ordinary skill in the art based on this disclosure.

The various embodiments described above can be combined to provide further embodiments. All of the U.S. patents and U.S. patent applications referred to in this specification are incorporated herein by reference, in their entirety. Aspects of the embodiments can be modified, if necessary to employ concepts of the various patents and applications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled.

The invention claimed is:

1. A force indicator arrangement for providing user feedback regarding a measuring force applied through a force actuator to a caliper jaw that moves along a caliper scale member along a measuring axis direction in a caliper, the force indicator arrangement comprising:
    an incremented member for being coupled to one of the caliper jaw and the force actuator, the incremented member comprising at least a first incremented section having a corresponding first increment marker;
    an engaging member for being coupled to the other of the caliper jaw and the force actuator, the engaging member comprising an engaging feature arranged to engage the first increment marker when the engaging member and the incremented member are positioned at a first relative displacement; and
    a compliant element for being positioned to couple forces between the force actuator and the caliper jaw to provide force on the caliper jaw along the measuring axis direction,
    wherein the force indicator arrangement is configured such that when it is coupled to the caliper jaw and the force actuator:
        the force actuator moves with the caliper jaw along the caliper scale member;
        when a force is applied to the force actuator to provide a force on the caliper jaw along the measuring axis direction, the compliant element deforms such that the force actuator undergoes a forced relative displacement relative to the one of the incremented member and the engaging member that is coupled to the caliper jaw, and generates a measuring force that depends on that forced relative displacement and is applied to the caliper jaw along the measuring axis direction; and
        when the forced relative displacement includes the first relative displacement, at least one of the engaging or disengaging of the engaging member with the first increment marker results in at least one of a tactile or auditory feedback being produced to indicate a corresponding first respective measuring force.

2. The force indicator arrangement of claim 1, wherein the compliant element comprises at least one of a bending spring element, a torsion spring element, a coil spring element, or an elastomeric material element.

3. The force indicator arrangement of claim 1, wherein:
    the compliant element is configured for bi-directional elastic coupling of the force actuator to the caliper jaw, such that force applied to the force actuator in a first direction generates a first polarity deformation of the compliant element which generates a first polarity measuring force applied to the caliper jaw, and force applied to the force actuator in a second direction generates a second polarity deformation of the compliant element which generates a second polarity measuring force applied to the caliper jaw;

the first incremented section having the corresponding first increment marker is a first polarity incremented section, the first relative displacement is a first polarity relative displacement, and the first respective measuring force is a force applied to the force actuator in the first direction;

the incremented member comprises a second polarity incremented section, having a corresponding second polarity increment marker, the engaging member is further arranged to engage the second increment marker when the engaging member and the incremented member are positioned at a second polarity relative displacement; and when the forced relative displacement includes the second polarity relative displacement, at least one of the engaging or disengaging of the engaging member with the second polarity increment marker results in at least one of a tactile or auditory feedback being produced to indicate a respective second polarity measuring force applied to the force actuator in the second direction.

4. The force indicator arrangement of claim 1, wherein:

the incremented member comprises at least a second incremented section, having a corresponding second increment marker, the engaging member is further arranged to engage the second increment marker when the engaging member and the incremented member are positioned at a second relative displacement that is greater than the first relative displacement; and when the forced relative displacement includes the second relative displacement, at least one of the engaging or disengaging of the engaging member with the second increment marker results in at least one of a tactile or auditory feedback being produced to indicate a corresponding second respective measuring force.

5. The force indicator arrangement of claim 4, wherein:

the incremented member comprises at least one additional incremented section, having a corresponding additional increment marker, the engaging member is further arranged to engage the additional increment marker when the engaging member and the incremented member are positioned at an additional relative displacement that is greater than the second relative displacement; and when the forced relative displacement includes the additional relative displacement, at least one of the engaging or disengaging of the engaging member with the additional increment marker results in at least one of a tactile or auditory feedback being produced to indicate a corresponding additional respective measuring force.

6. The force indicator arrangement of claim 1, further comprising a stop arrangement configured to provide a maximum relative displacement limit between the force actuator and the one of the incremented member and the engaging member that is coupled to the caliper jaw, such that deformation of the compliant element is limited to substantially exclude plastic deformation of the compliant element.

7. The force indicator arrangement of claim 6, wherein the stop arrangement is configured to transmit additional force between the force actuator and the caliper jaw once the maximum relative displacement limit is reached.

8. The force indicator arrangement of claim 1, wherein the force indicator arrangement is configured such that a respective relative displacement of at least 0.5 mm and at most 5.0 mm corresponds to a respective measuring force of at least 0.1 newtons and at most 10 newtons.

9. The force indicator arrangement of claim 1, wherein the first increment marker comprises a first raised portion of the incremented member, and the engaging member comprises a protruding feature configured to interfere with or be deflected by the first raised portion when the engaging member and the incremented member are positioned proximate to the first relative displacement.

10. The force indicator arrangement of claim 1, wherein the force indicator arrangement is configured to mount to the caliper jaw of existing calipers using a fastening configuration that is compatible with existing mounting features on the caliper jaw.

11. The force indicator arrangement of claim 10, wherein the existing calipers do not include a force actuator, the force indicator arrangement comprises the force actuator, and the force actuator is retrofitted to the existing calipers as part of the force indicator arrangement.

12. The force indicator arrangement of claim 10, wherein the force indicator arrangement is included with a set of interchangeable force indicator arrangements, wherein each respective force indicator arrangement in the set provides a respective compliant element having a different respective spring rate.

13. The force indicator arrangement of claim 10, wherein the force indicator arrangement is included with a set of interchangeable force indicator arrangements, wherein at least one respective force indicator arrangement in the set provides a different first incremented section having a different respective size corresponding to a different first relative displacement in comparison to other members of the set, in order to indicate a first respective measuring force that is different in comparison to that indicated by other members of the set.

14. The force indicator arrangement of claim 1, wherein the incremented member is coupled to the caliper jaw and the engaging member is coupled to the force actuator.

15. The force indicator arrangement of claim 1, wherein the incremented member is coupled to the force actuator and the engaging member is coupled to the caliper jaw.

16. The force indicator arrangement of claim 1, wherein the compliant element couples the force actuator to the caliper jaw.

17. The force indicator arrangement of claim 1, wherein the engaging member comprises an engagement element that is located on the force actuator.

18. A force indicator arrangement for providing user feedback regarding a measuring force applied through a force actuator to a caliper jaw that moves along a caliper scale member along a measuring axis direction in a caliper, the force indicator arrangement comprising:

an incremented member comprising at least a first incremented section having a corresponding first increment marker;

an engaging member comprising an engaging feature arranged to engage the first increment marker when the engaging member and the incremented member are positioned at a first relative displacement; and a compliant element for coupling the incremented member to the engaging member, wherein the force indicator arrangement is configured such that when it is coupled to the caliper jaw and the force actuator:

at least one of the engaging or disengaging of the engaging member with the first increment marker results in at least one of a tactile or auditory feedback being produced to indicate a corresponding first respective measuring force arising from deformation of the compliant element.

19. The force indicator arrangement of claim 18, wherein:

the incremented member comprises at least a second incremented section having a corresponding second increment marker, the engaging member is further arranged to engage the second increment marker when the engaging member and the incremented member are positioned at a second relative displacement that is greater than the first relative displacement; and at least one of the engaging or disengaging of the engaging member with the second increment marker results in at least one of a tactile or auditory feedback being produced to indicate a corresponding second respective measuring force arising from deformation of the compliant element.

20. A method for retrofitting an existing caliper with a force indicator arrangement, the existing caliper including a caliper jaw that moves along a caliper scale member along a measuring axis direction in the caliper, the method comprising:

providing a force indicator arrangement comprising:

an incremented member comprising at least a first incremented section having a corresponding first increment marker;

an engaging member comprising an engaging feature arranged to engage the first increment marker when the engaging member and the incremented member are positioned at a first relative displacement; and a compliant element for coupling the incremented member to the engaging member, and coupling the force indicator arrangement to the caliper jaw using a fastening configuration that is compatible with existing mounting features on the caliper jaw;

wherein the force indicator arrangement is configured such that when it is coupled to the caliper jaw:

at least one of the engaging or disengaging of the engaging member with the first increment marker results in at least one of a tactile or auditory feedback being produced to indicate a corresponding first respective measuring force arising from deformation of the compliant element.

* * * * *